United States Patent [19]
Munguia

[11] Patent Number: 6,081,859
[45] Date of Patent: *Jun. 27, 2000

[54] ADDRESS DEPENDENT RETRY SYSTEM TO PROGRAM THE RETRY LATENCY OF AN INITIATOR PCI AGENT

[75] Inventor: Gabriel Roland Munguia, Phoenix, Ariz.

[73] Assignee: VLSI Technology, Inc., San Jose, Calif.

[ * ] Notice: This patent is subject to a terminal disclaimer.

[21] Appl. No.: 09/041,892

[22] Filed: Mar. 12, 1998

[51] Int. Cl.[7] .................................................. G06F 13/00
[52] U.S. Cl. .................................. 710/107; 710/4; 710/5; 710/39; 710/45; 710/110; 710/112; 113/117; 113/118; 113/105; 113/125; 113/126; 113/241
[58] Field of Search ..................................... 710/107, 110, 710/112, 113, 117, 125, 241, 4, 5, 39, 45

[56] References Cited

U.S. PATENT DOCUMENTS

| | | | |
|---|---|---|---|
| 4,281,380 | 7/1981 | DeMesa, III et al. | 710/119 |
| 5,227,775 | 7/1993 | Bruckert et al. | 340/825.25 |
| 5,623,694 | 4/1997 | Arimilli et al. | 710/5 |
| 5,717,872 | 2/1998 | Whittaker | 710/105 |
| 5,771,235 | 6/1998 | Tang et al. | 370/446 |
| 5,884,052 | 3/1999 | Chambers et al. | 710/107 |

*Primary Examiner*—Ayaz R. Sheikh
*Assistant Examiner*—Frantz Blanchard Jean
*Attorney, Agent, or Firm*—Wagner, Murabito & Hao LLP

[57] ABSTRACT

The present invention comprises a smart retry system for a PCI (peripheral component interconnect) agent in a PCI bus system. The system of the present invention includes an initiator PCI agent, a retry identification register, and a completion counter. The initiator PCI agent is adapted to couple to a PCI bus and communicate with a target PCI agent via the PCI bus by initiating a data transaction. The retry identification register is coupled to the initiator PCI agent. The retry identification register is adapted to store a target address and a transaction type corresponding to the target PCI agent when the target PCI agent issues a retry to the initiator PCI agent. The completion counter is coupled to the initiator PCI agent and is adapted to measure a latency period of the target PCI agent. The completion counter couples the latency period to the initiator PCI agent such that the initiator PCI agent efficiently completes a subsequent access corresponding to the target address and to the transaction type by initiating the subsequent access at the expiration of the latency period.

27 Claims, 6 Drawing Sheets

ADDRESS DEPENDENT RETRY SYSTEM TO PROGRAM THE RETRY LATENCY OF AN INITIATOR PCI AGENT

TECHNICAL FIELD

The present invention pertains to the field of computer system bus architectures. More particularly, the present invention relates to a programmable retry mechanism to reduce unnecessary retry bus transactions between initiating devices and target devices.

BACKGROUND ART

A bus architecture of a computer system conveys much of the information and signals involved in the computer system's operation. In a typical computer system, one or more busses are used to connect a central processing unit (CPU) to a memory and to input/output elements so that data and control signals can be readily transmitted between these different components. When the computer system executes its programming, it is imperative that data and information flow as fast as possible in order to make the computer as responsive as possible to the user. With many peripheral devices, such as graphics adapters, full motion video adapters, small computer systems interface (SCSI) host bus adapters, and the like, it is imperative that large block data transfers be accomplished expeditiously. These applications are just some examples of subsystems that benefit substantially from a very fast bus transfer rate.

Much of a computer system's functionality and usefulness to a user is derived from the functionality of the peripheral devices. For example, the speed and responsiveness of the graphics adapter is a major factor in a computer system's usefulness as an entertainment device. Or, for example, the speed with which video files can be retrieved from a hard drive and played by the graphics adapter determines the computer system's usefulness as a training aid. Hence, the rate at which data can be transferred among the various peripheral devices often determines whether the computer system is suited for a particular purpose. The electronics industry has, over time, developed several types of bus architectures. Recently, the PCI (peripheral component interconnect) bus architecture has become one of the most widely used, widely supported bus architectures in the industry. The PCI bus was developed to provide a high speed, low latency bus architecture from which a large variety of systems could be developed.

Figure 1:
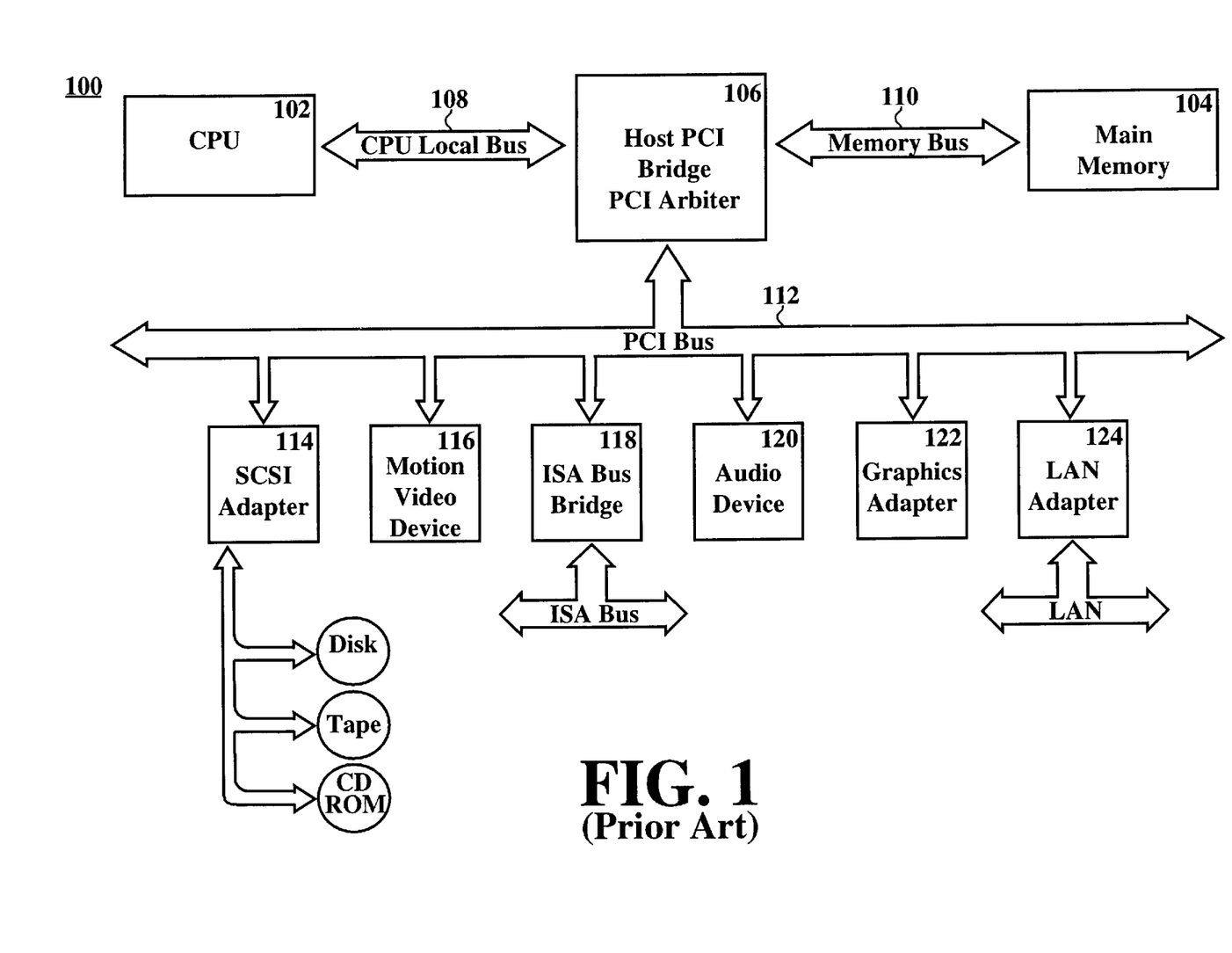
FIG. 1 is a typical PCI bus architecture of the prior art.

Prior Art FIG. 1 shows a typical PCI bus architecture 100. PCI bus architecture 100 is comprised of a CPU 102 and a main memory 104, coupled to a host PCI bridge containing arbiter 106 (hereafter arbiter 106) through a CPU local bus 108 and memory bus 110, respectively. A PCI bus 112 is coupled to each of PCI agents 114, 116, 118, 120, 122, 124 respectively, and is coupled to arbiter 106.

Referring still to Prior Art FIG. 1, each of PCI agents 114, 116, 118, 120, 122, 124 (hereafter, PCI agents 114–124) residing on PCI bus 112 use PCI bus 112 to transmit and receive data. PCI bus 112 is comprised of functional signal lines, for example, interface control lines, address/data lines, error signal lines, and the like. Each of PCI agents 114–124 are coupled to the functional signal lines comprising PCI bus 112. When one of PCI agents 114–124 requires the use of PCI bus 112 to transmit data, it requests PCI bus ownership from arbiter 106. The PCI agent requesting ownership is referred to as an "initiator", or bus master. Upon being granted ownership of PCI bus 112 from arbiter 106, the initiator (e.g., PCI agent 116) carries out its respective data transfer.

Each of PCI agents 114–124 may independently request PCI bus ownership. Thus, at any given time, several of PCI agents 114–124 may be requesting PCI bus ownership simultaneously. Where there are simultaneous requests for PCI bus ownership, arbiter 106 arbitrates between requesting PCI agents to determine which requesting PCI agent is granted PCI bus ownership. When one of PCI agents 114–124 is granted PCI bus ownership, it initiates it transaction (e.g., data transfer) with a "target" or slave device (e.g., main memory 104). When the data transaction is complete, the PCI agent relinquishes ownership of the PCI bus, allowing arbiter 106 to reassign PCI bus 112 to another requesting PCI agent.

Thus, only one data transaction can take place on a PCI bus at any given time. In order to maximize the efficiency and data transfer bandwidth of PCI bus 112, PCI agents 114–124 follow a definitive set of protocols and rules. These protocols are designed to standardize the method of accessing, utilizing, and relinquishing PCI bus 112, so as to maximize its data transfer bandwidth. The PCI bus protocols and specifications are set forth in an industry standard PCI specification (e.g., PCI Specification - Revision 2.1). Where each of PCI agents 114–124 are high performance, well designed devices, data transfer rates of up to 528 Mbytes per second can be achieved (e.g., PCI bus 112 operating at 66 MHz).

There is a problem, however, when PCI bus architecture 100, as is often the case, includes PCI agents which are slower than others. Where one of PCI agents is much slower than the other PCI agents, this slowest PCI agent can potentially monopolize PCI bus 112, greatly harming the total data transfer bandwidth. For example, PCI agent 118 is an ISA (industry standard architecture) bus bridge. PCI agent 118 is thus much slower than the other PCI agents. Since the ISA bus runs much slower than the PCI bus and other peripheral devices coupled to the ISA bus can be slower still, PCI agent 118 can have a very slow access time. This causes an initiator (e.g., PCI agent 122) to wait for access, potentially tying up PCI bus 112 in the process.

In addition, it should be noted that there may be other reasons a target may have a slow access time. For example, the target may be busy with some internal activity and is unable to service the access at that time, or the access would generate some sort of internal conflict (e.g., with data ordering or coherency). Hence, to avoid monopolization problems, the PCI specification dictates that a target should issue a "retry" if its latency will exceed 16 PCI clock cycles. Accordingly, where a target "knows" it will be slow completing an access, it may issue a retry in order to free up the PCI bus for other initiators.

Figure 2:
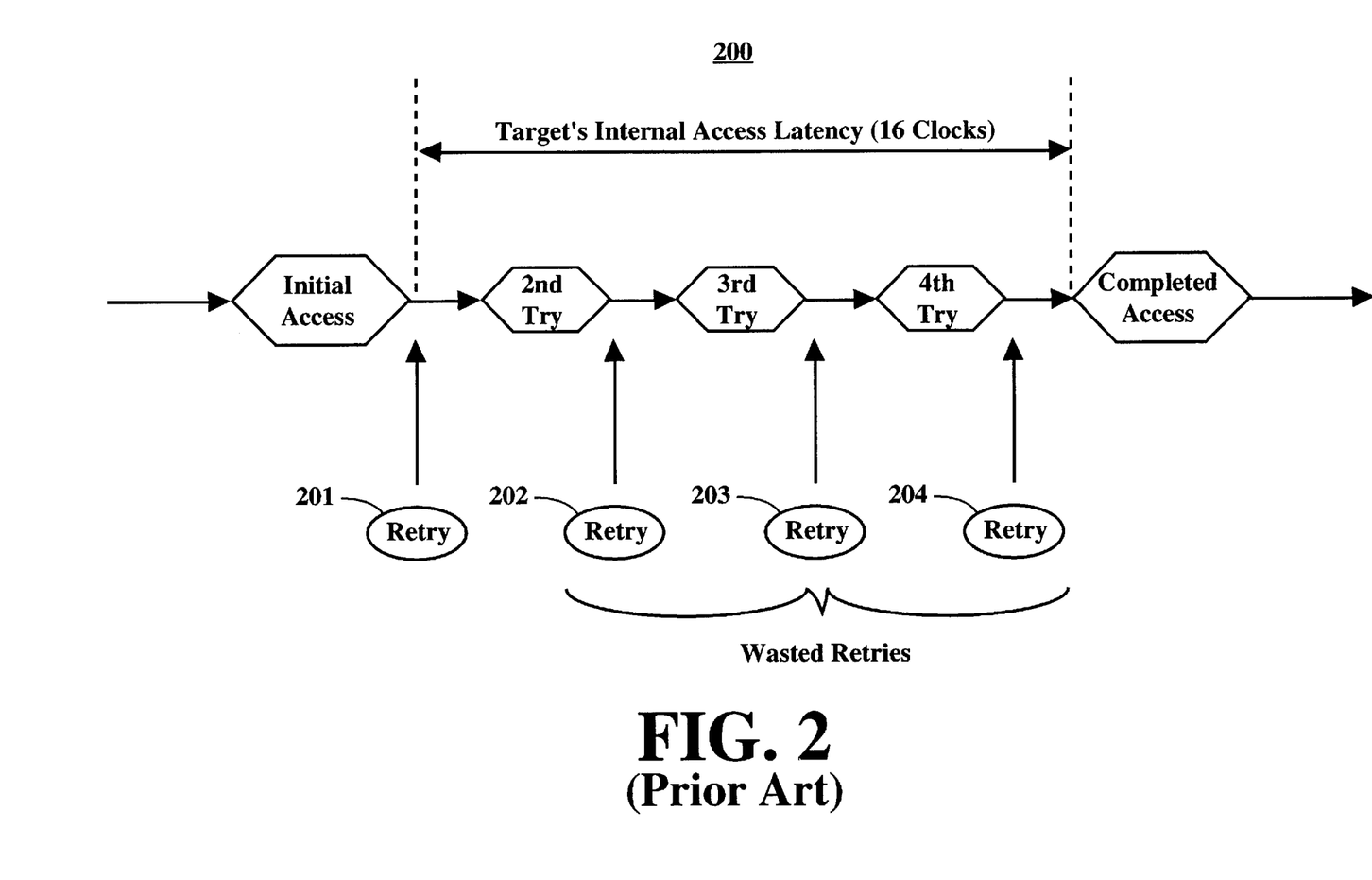
FIG. 2 is a diagram illustrating an attempted access by a fast initiator PCI agent to a slow target PCI agent.

Prior Art FIG. 2 shows a diagram of a prior art access process 200. Process 200 is an access by a fast initiator PCI agent to a slow target PCI agent. The fast initiator PCI agent (e.g., PCI agent 122) has a high data transfer rate and the slower target PCI agent (e.g., PCI agent 118) is a device having a slow data transfer rate and a high latency. On the left side of process 200, the initiator attempts to access the target, shown as the initial access. The initial access is comprised of the normal stages of a PCI data transaction (e.g., arbitration for bus ownership, receiving a grant signal from the arbiter, and the like). The initial access addresses and informs the target of the data to be transferred. The target, as described above, is an ISA bus bridge having a high latency period. In this example, the target has a latency of 16 PCI clock cycles. Accordingly, since the target cannot comply with the data transaction requested in the initial access, it issues a retry 201. This forces the initiator to relinquish the PCI bus (e.g., PCI bus 112) for use by other initiators. The initiator subsequently, arbitrates for and acquires the PCI bus for a second try. The target is still not ready, and thus, issues retry 202, forcing the initiator to again relinquish the PCI bus.

Hence, as shown in process 200, the initiator continually attempts to execute its data transaction, and continually is forced to retry. This process proceeds through the third and fourth try, and their respective retries 203 and 204. After retry 204, the 16 PCI clock cycle latency of the target expires, and finally, the initiator achieves a completed access. However, during the second try, the third try, and the fourth try, the PCI bus is tied up by the initiator and is unavailable to other requesting PCI agents. In this manner, the initiator repeatedly attempting to access the slow target causes a decrease in the availability of the PCI bus with respect to the other PCI agents. This diminishes the total data transfer bandwidth of the PCI bus, and hence, the functionality of the computer system. In addition, since the initiator has no way of knowing when the target will be ready to complete its access, the initiator must continually retry, not knowing when the latency period will expire. This ultimately leads to longer access times for the initiator since each time it attempts to access the target, it must arbitrate for, and be granted, the PCI bus.

Thus, what is required is method and system which minimizes or even eliminates the wasted retry accesses where a faster initiator PCI agent continually attempts to access a slower target PCI agent. The required system should reduce the effective access time for the retrying PCI agents, reducing the effects of repeated access attempts and making the data transaction process with the slower target PCI agent more efficient. The required system should significantly increase the available PCI bus data transfer bandwidth available to other PCI agents. In addition, the required system should provide for the issue of a retry access at an optimal time. The present invention provides a novel solution to the above requirements.

DISCLOSURE OF THE INVENTION

The present invention is a novel method and system which minimizes or even eliminates the wasted retry accesses where a faster initiator PCI agent continually attempts to access a slower target PCI agent. The system of the present invention reduces the effective access time for the retrying PCI agents, thus reducing the effects of repeated access attempts on the PCI bus and making the data transaction process with the slower target PCI agent more efficient. The system of the present invention significantly increases the available PCI bus data transfer bandwidth available to other PCI agents. In addition, the present invention provides for the issue of a retry access at an optimal time.

In one embodiment, the present invention comprises an address dependent retry prediction system for an initiator PCI (peripheral component interconnect) agent in a PCI bus system. The system of the present invention includes an initiator PCI agent, a retry identification register, and a completion counter. The initiator PCI agent is adapted to couple to a PCI bus and communicate with a target PCI agent via the PCI bus by initiating a data transaction (e.g., an access). The retry identification register is coupled to the initiator PCI agent. The retry identification register is adapted to store a target address and a data transaction type corresponding to the access of the target PCI agent. The completion counter is also coupled to the initiator PCI agent and is adapted to measure a latency period of the target PCI agent.

The target address, transaction type, and latency period are stored by the initiator PCI agent when the target PCI agent issues a retry to the initiator PCI agent in response to the access. In so doing, the initiator PCI agent becomes aware of the latency characteristics of the target PCI agent. Hence, on a subsequent access, the initiator PCI agent times the subsequent access in accordance with the latency period, thereby allowing the target PCI agent time to respond. In this manner the initiator PCI agent successfully and efficiently completes the subsequent access, avoiding numerous retries, thus enhancing the data transfer bandwidth of the PCI bus.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

BEST MODE FOR CARRYING OUT THE INVENTION

Reference will now be made in detail to the preferred embodiments of the invention, an address dependent retry system to program the retry latency of a initiator PCI agent, examples of which are illustrated in the accompanying drawings. While the invention will be described in conjunction with the preferred embodiments, it will be understood that they are not intended to limit the invention to the these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The present invention, an address dependent retry system to program the retry latency of a PCI initiator agent, provides a method and system which minimizes or even eliminates the wasted retry access where a faster initiator PCI agent continually attempts to access a slower target PCI agent. The system of the present invention reduces the effective access time for the retrying PCI agents, thus reducing the effects of repeated access attempts and making the data transaction process with the slower target PCI agent more efficient. The system of the present invention significantly increases the available PCI bus data transfer bandwidth available to other PCI agents. In addition, the present invention provides for the issue of a retry access at an optimal time. The present invention and its benefits are discussed in greater detail below.

Figure 3A:
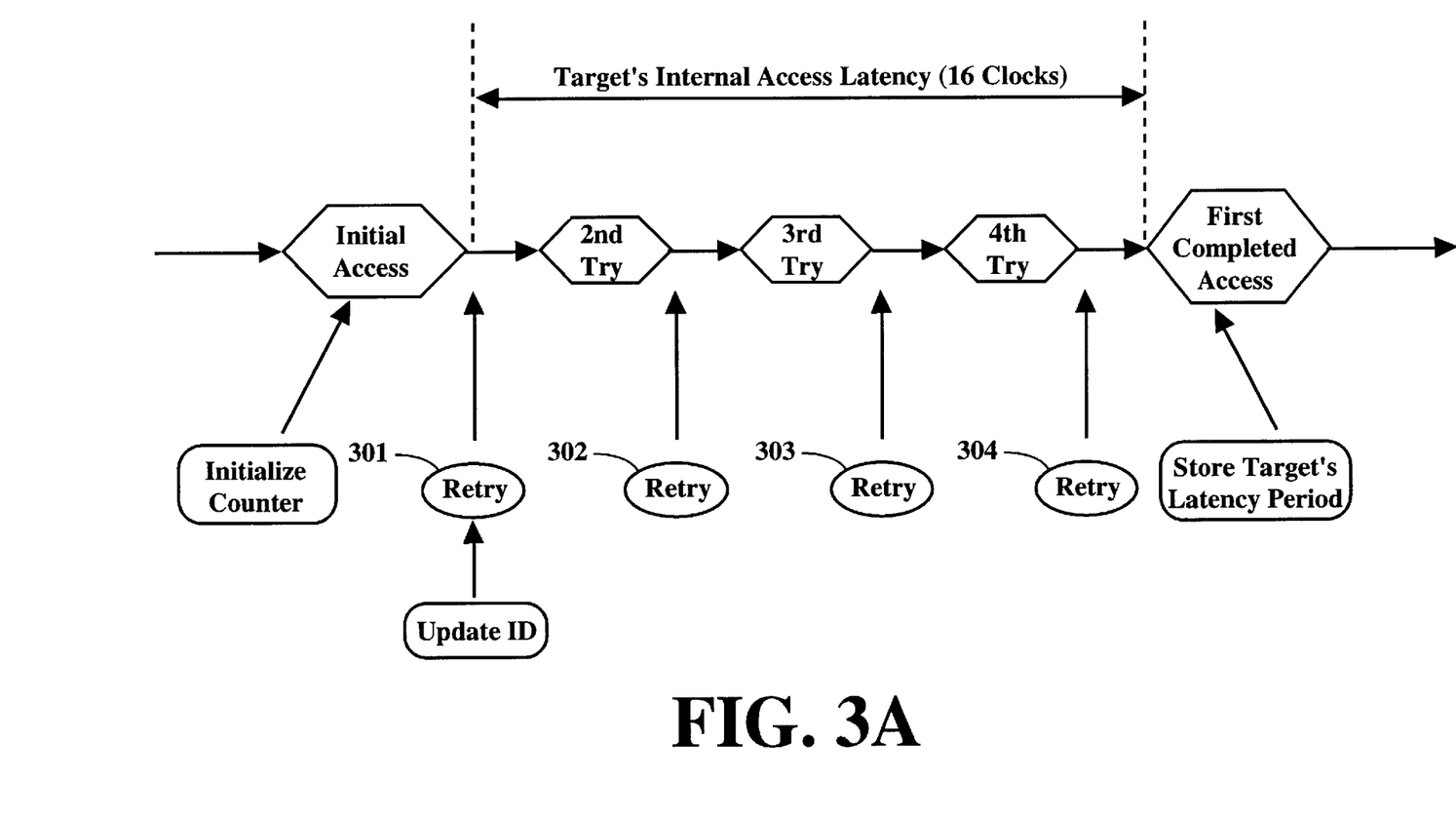
FIG. 3A is a diagram of an initial access of an address dependent retry process in accordance with one embodiment of the present invention.
Figure 3B:
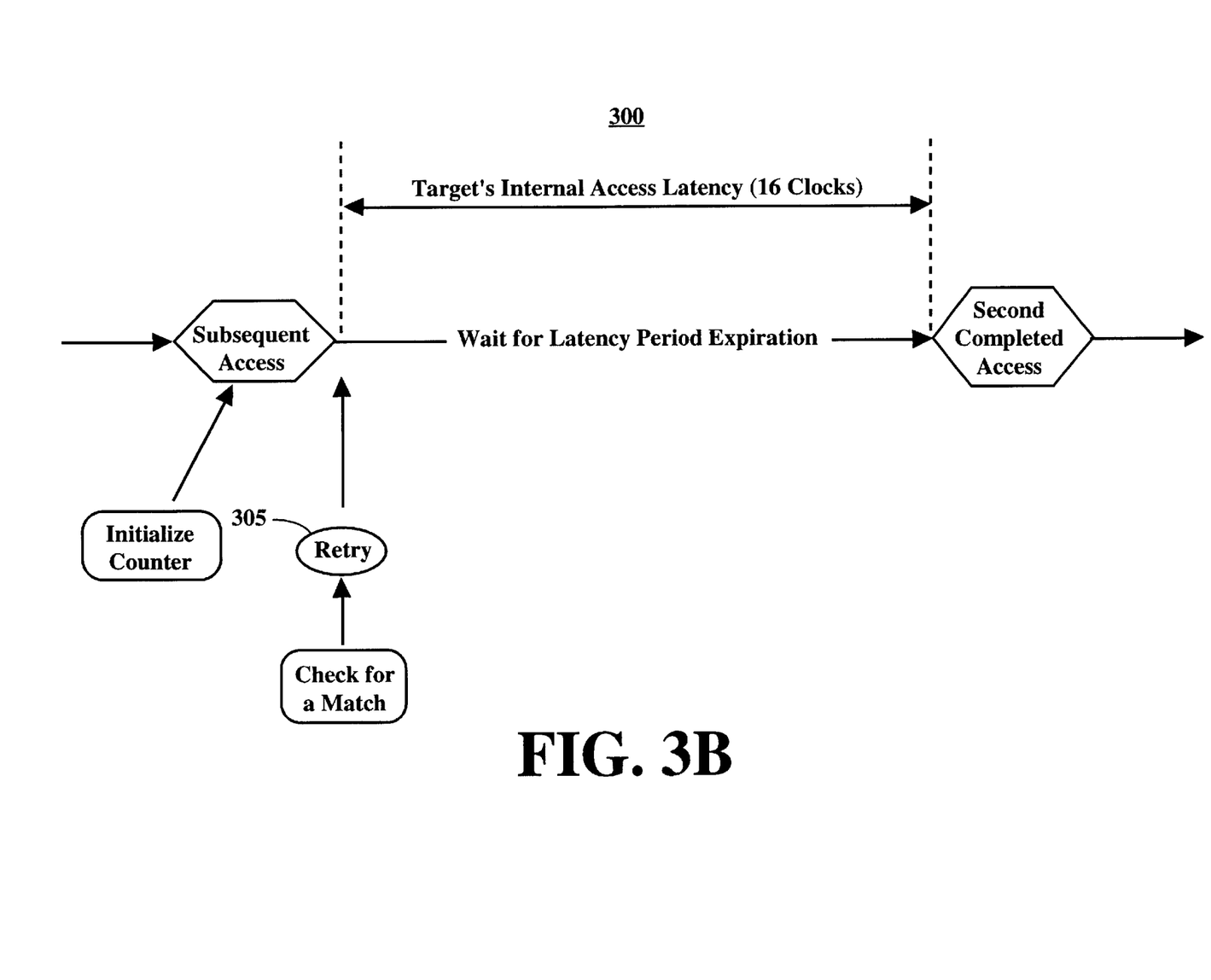
FIG. 3B is a diagram of a subsequent access of the address dependent retry process from FIG. 3A.

FIG. 3A and FIG. 3B are diagrams of an address dependent retry process 300 in accordance with one embodiment of the present invention. FIG. 3A shows an initial access and a first completed access (e.g., data transaction) between an initiator PCI agent and a target PCI agent. FIG. 3B shows a subsequent access and a second completed access between the initiator PCI agent and the target PCI agent.

Referring to FIG. 3A, the initiator PCI agent is a relatively high performance PCI agent having a low latency. The target PCI agent is a relatively slow performing, high latency PCI agent. On the left side of process 300, an initial access from the initiator to the target is shown. On the right side of process 300, a completed access is shown. The initial access is comprised of the normal stages of a PCI data transaction, for example, arbitration for bus ownership, receiving a grant signal from the arbiter, and the like. The initial access, in accordance with the PCI specification, identifies the particular PCI target agent for the transaction by addressing the target PCI agent. In addition, the initiator PCI agent signals the type of data transaction desired by asserting the appropriate command/byte enables. This identifies the target PCI agent (with respect to other targets within the system) and describes the nature of the data transaction (e.g., data read, data write, etc.). The initial access is a data read from the target PCI agent to the initiator PCI agent. Due to the target PCI agent's data access latency, it issues a retry, causing the initiator PCI agent to terminate the data transaction before completion.

In the example of FIG. 3A, the target has an internal access latency of 16 PCI clock cycles. During the initial access, in accordance with the present invention, the initiator PCI agent initializes a completion counter. The completion counter is a register incremented by the PCI clock such that it measures the period of time between the initial access and the completed data transaction. This period of time is referred to as a latency period. The completion counter increments synchronously with the PCI clock signal.

After receiving the first retry (e.g., retry 301), the initiator PCI agent continually attempts to access the target PCI agent, and receives a retry each time (e.g., retries 302–304), until the target PCI agent is ready to accept and complete the data transaction (e.g., 16 PCI cycles later, after having successfully fetched the requested data). During this time, the completion counter is continually incremented with the PCI clock. Once the target PCI agent accepts the data transaction from the initiator PCI agent (e.g., asserts its target ready signal) the completion counter stops incrementing, thereby measuring the latency period for the target PCI agent. The latency period is subsequently stored in a retry delay register. To associate this latency period with this particular target PCI agent, the target identification (ID) is updated. This involves storing the data transaction type (e.g., the address and command byte enables) for the target PCI agent upon receiving the first retry (e.g., retry 301).

The address uniquely identifies the particular target PCI agent and the command/byte enables identify the type of data transaction (e.g., data read, data write, etc.). This information is stored in a retry identification register (hereafter retry ID register) when the initiator PCI agent first receives the first retry from the target PCI agent. With the information stored in the retry ID register and the information stored in the retry delay register, the initiator PCI agent is now aware of the latency characteristics of the target PCI agent for that type of transaction (e.g., a data read). Consequently, in a subsequent access, the initiator PCI agent can precisely account for the latency of the target PCI agent.

Referring now to FIG. 3B, with the subsequent access, once again, the initiator PCI agent initializes the completion counter and accesses the target PCI agent. And once again, the target PCI agent issues a retry (e.g., retry 305). However, in accordance with the present invention, the initiator PCI agent is aware of the latency of this particular target PCI agent. When the initiator PCI agent receives the first retry after the subsequent access (e.g., retry 305), it checks the address and command byte enables of the subsequent access against the information stored in the retry ID register (e.g., the address and command/byte enables from the initial access). Upon finding a match, the initiator PCI agent waits for the expiration of the latency period. The initiator PCI agent waits until the completion counter increments to match the latency period stored in the retry delay register before reattempting access. When the completion counter matches the latency period, the initiator PCI agent reattempts its access at precisely the time the target PCI agent is ready to deliver the requested data. In so doing, the initiator PCI agent precisely accounts for the latency of the target PCI agent such that the subsequent access after the retry is timed to occur when the requested data is available internally within the target PCI agent.

Thus, in process 300, after the initial access, the initiator waits until the expiration of the target's internal access latency (16 PCI clock cycles) and then accesses the target again, resulting in a completed data transaction. In this manner, the process of the present invention allows the initiator to time a subsequent access after a retry to coincide with the readiness of the data or resources within the target, thus allowing the issue of a retry access at an optimal time. By precisely measuring the latency of a target PCI agent, the process of the present invention allows the reduction of wasted retries, thereby increasing the data transfer bandwidth of the PCI bus, hence, enhancing the speed and the efficiency of the overall computer system.

In accordance with the present invention, the retry identification register and the retry delay register allow the initiator PCI agent to recognize a target PCI agent having a high latency. In addition to recognizing a target PCI agent having a high latency, the retry identification register and a retry delay register allow the initiator PCI agent to recognize the particular data transaction type subject to high latency within the particular target PCI agent. For example, in those situations where a read data transaction is subject to high latency, but a write data transaction is not, the initiator PCI agent will recognize this. The read data transaction will incur successive retries and will increment the completion counter accordingly, resulting in a stored latency period (specific to that target and that transaction type). The write data transaction, however, will not incur a retry, and thus, will not increment the completion counter or result in any stored latency period. In this manner, the delays introduced by the process of the present invention are highly specific. The information stored in the retry identification register and in the retry delay register ensure the initiator PCI agent waits (as depicted in FIG. 3B) only when required.

Process 300 allows the initiator PCI agent to become aware of those target PCI agents requiring larger amounts of time to fulfill the requested data transactions. The initiator PCI agent times its subsequent retry accesses to allow these target PCI agents the necessary time to acquire the resources to complete the data transactions. The target PCI agents are identified by their address and by the transaction type. Hence, the initiator PCI agent need not treat all accesses to a high latency target PCI agent the same. Those transaction types requiring longer amounts of time to complete are treated accordingly. Those transaction types which can be handled without delay are executed quickly. In this manner, address and operation type comparisons permit an initiator PCI agent in accordance with the present invention to access a target PCI agent that may often have address or operation type dependent response times. This latency awareness minimizes the allocation of resources competing for the PCI bus, thereby improving PCI bus data transfer bandwidth.

Referring still to FIG. 3A and FIG. 3B, process 300 is depicted storing a single "retry cycle" (e.g., a single latency period and its corresponding address and command/byte enables). However, it should be appreciated that the present invention can be implemented to store several retry cycles. In such embodiment, an initiator PCI agent would include multiple retry delay registers and respective retry identification registers, which in turn, would store multiple retry cycles (e.g., the portion of process 300 from the initial transaction to the first completed access). The stored retry cycles would correspond to write data transactions, read data transactions, configuration accesses, and the like, for the various target PCI agents coupled to the PCI bus. The stored retry cycles would allow the initiator PCI agent to tailor its accesses according to the latency characteristics of the particular target PCI agents.

It should be appreciated that in one embodiment, in order to avoid consistent use of a worst-case latency period, the initiator PCI agent uses multiple retry delay registers to store a "history" of the most recent retry cycles (e.g., for a particular target PCI agent and a particular data transaction type). For example, a first retry delay register would contain the most recent latency period, a second retry delay register would contain the previous latency period, etc. An average of the latency periods is calculated and an "early prediction" is used based upon some portion of that average. Hence during a subsequent access, to avoid consistently using the worst-case latency period, the PCI initiator re-attempts an access in accordance with the early prediction. If the early prediction is successful (e.g., leads to a completed access) the early prediction latency period is loaded into each of the respective retry delay registers (e.g., corresponding to the particular target PCI agent and particular data transaction type) and is used for the next access. If the early prediction is unsuccessful (e.g., receives a retry from the target PCI agent) then the most recent latency period is used for the next access. This allows latency periods for subsequent accesses to migrate up or down as response times for the target PCI agent fluctuate. In so doing, the initiator PCI agent of the present invention guards against making a poor prediction based on an atypically long retry cycle.

Figure 4:
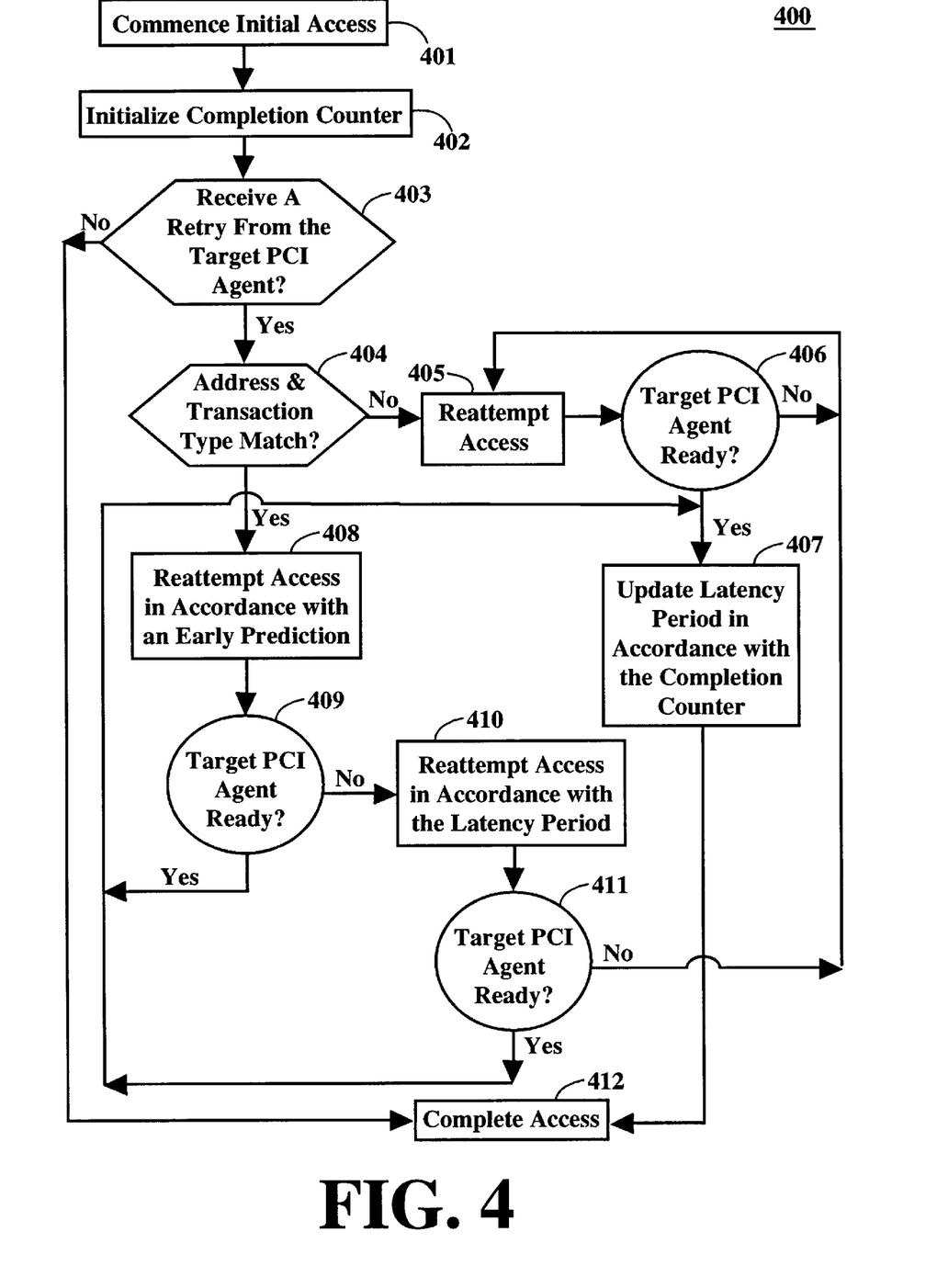
FIG. 4 is a flow chart of the steps performed in an address dependent retry process in accordance with one embodiment of the present invention.

With reference now to FIG. 4, a flow chart 400 of the steps performed in an address dependent retry process in accordance with one embodiment of the present invention is shown. Flow chart 400 shows the steps of an address dependent retry prediction process between an initiator PCI agent and a target PCI agent. The process of flow chart 400 functions in a similar manner as process 300, however, the process of flow chart 400 includes steps depicting the early prediction process of the present invention.

In step 401, an initiator PCI agent commences an initial access to a target PCI agent. This access, as described above, includes the normal PCI bus procedures, such is arbitrating for PCI bus ownership, addressing the target PCI agent, identifying the data transaction type, and the like.

In step 402, upon commencing the initial access, the initiator PCI agent initializes a completion counter. As described above, this completion counter is a value stored in a completion counter register coupled to the initiator PCI agent. The completion counter is incremented synchronous to the PCI clock signal such that it measures that number of PCI clock cycles required to complete the initial access.

In step 403, the initiator PCI agent determines whether it receives a retry from the target PCI agent in response to the initial access. As described above, there may be several reasons why the target PCI agent issues the retry. For example, if the initial access is a read data transaction, it may take some period of time for the target PCI agent to retrieve the requested data. If the initial access is a write data transaction, it may take some period of time for the target PCI agent to ready the necessary resources (e.g., empty an input buffer) to accept the data from the initiator PCI agent.

In step 404, where the initiator PCI agent does not receive a retry from the target PCI agent in response to the initial access, the process proceeds to step 412, and completes the access (e.g., executes the data transaction). Where the initiator PCI agent does receive a retry from the target PCI agent, the process proceeds to step 404.

In step 404, where the initiator PCI agent does receive a retry, the initiator PCI agent determines whether there is a match between the target address and data transaction type of the initial access and the target address and data transaction type stored in a retry ID register. As described above, the retry ID register is used to store the target address and data transaction type corresponding to a previous access attempt in which the initiator PCI agent received a retry. In so doing, the retry ID register allows the initiator PCI agent to "remember" which target PCI agent and what transaction type resulted in the most recently received retry. If this information for the initial access matches the information stored in the retry ID register, the process proceeds to step 408 to re-attempt access in accordance with an early prediction latency period. If there is not a match with the retry ID register, the process proceeds to step 405 to re-attempt access in accordance with a "normal" retry cycle.

In step 405, where there is not a match with the retry ID register, the initiator PCI agent reattempts access in accordance with a normal retry cycle. In accordance with the PCI specification, the initiator PCI agent relinquishes the PCI bus. After waiting a short period of time (e.g., 2 PCI clock cycles), the initiator PCI agent reattempts an access to the target PCI agent.

In step 406, the initiator PCI agent determines whether the target PCI agent is ready to complete the access. The target PCI agent signals whether it is ready by asserting a target ready signal. If the target PCI agent is ready, the process proceeds to step 407. If the target PCI agent is not ready, the process proceeds back to step 405 and reattempts the access to the target PCI agent.

In step 407, where the target PCI agent is ready, the initiator PCI agent updates a latency period stored in a retry delay register in accordance with the completion counter. As described above, the completion counter measures the the number of PCI clock cycles which elapsed from the commencement of the initial access (e.g., in step 401) untill the successful completion of the data transaction. Consequently, once updated, the latency period reflects the amount of time required to complete the data transaction of the initial access and thus characterizes the latency of the target PCI agent. The process subsequently proceeds to step 412 to complete the data transaction of the initial access.

In step 408, where the information for the initial access matches the information stored in the retry ID register, the initiator PCI agent reattempts access in accordance with the early prediction latency period. As described above, the early prediction latency period is based upon some portion of the "normal" latency period stored in the retry delay register. The early prediction latency period functions by allowing the latency period used for retry prediction by the initiator PCI agent to migrate up or down as the response times for the target PCI agent fluctuate. Hence, instead of waiting for the expiration of the normal latency period before reattempting access, the initiator PCI agent reattempts access at the expiration of the early prediction latency period.

In step 409, the initiator PCI agent determines whether the target PCI agent is ready to complete the access. Where the target PCI agent is ready, the process proceeds to step 407 to update the retry delay register in accordance with the completion counter, and then to step 412 to complete the initial access data transaction. Where the target PCI agent is not ready, the process proceeds to step 410.

In step 410, the initiator PCI agent reattempts an access in accordance with the "normal" latency period stored in the retry delay register. The initiator PCI agent waits for the expiration of the latency period before re-attempting access since the early prediction retry was not successful.

In step 411, the initiator PCI agent determines whether the target PCI agent is ready to complete the access. Where the target PCI agent is ready, the process proceeds to step 407 to update the retry delay register, and then to step 412 to complete the initial access data transaction. Where the target PCI agent is not ready, the process proceeds to step 405 to reattempt an access after waiting a short period of time (e.g., 2 PCI clock cycles).

Figure 5:
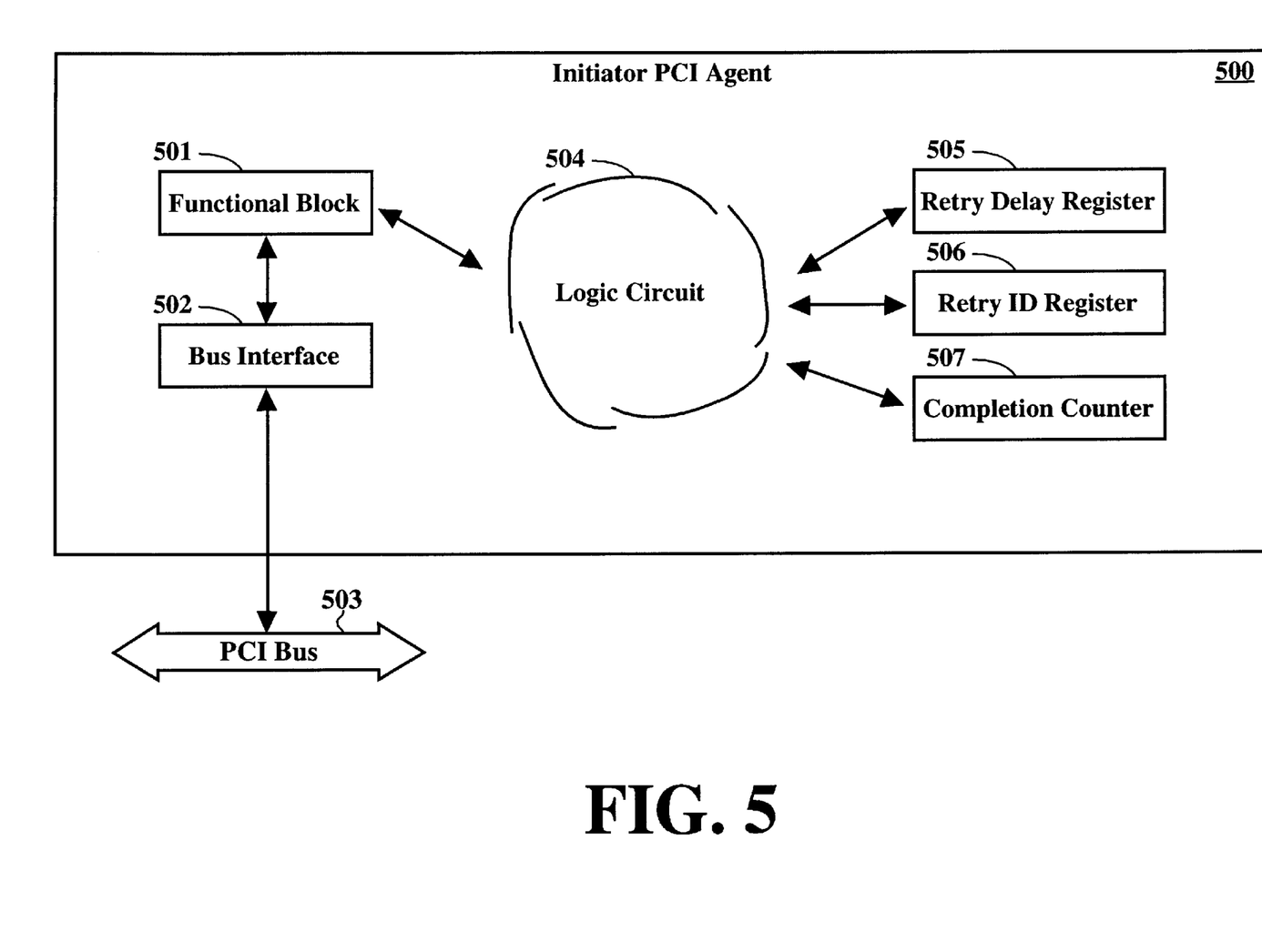
FIG. 5 is a diagram of an initiator PCI agent in accordance with one embodiment of the present invention.

With reference now to FIG. 5, an initiator PCI agent 500 in accordance with one embodiment of the present invention is shown. Initiator PCI agent 500 includes a functional block 501 coupled to a bus interface 502, which in turn couples to a PCI bus 503. Initiator PCI agent 500 also includes a retry delay register 505, a retry ID register 506, and a completion counter register 507, each coupled to functional block 501 via a logic circuit 504.

Functional block 501 and bus interface 502, as with other typical initiator PCI agents, together provide the functionality for both implementing the particular purpose of initiator PCI agent 500 (e.g., implementing the modem functions in the case where initiator PCI agent 500 is a modem) and implementing the PCI bus protocols for communication via PCI bus 503.

In accordance with the present invention however, initiator PCI agent 500 also includes retry delay register 505, retry ID register 506, and completion counter register 507 for implementing address dependent retry prediction. As described above, retry delay register 505 stores a latency period characterizing the latency of the target PCI agent, retry ID register 506 stores the address of the target PCI agent and the data transaction type (e.g., command/byte enables), and completion counter register 507 stores a completion counter measuring the latency period. Logic circuit 504 functions by interfacing registers 505, 506, and 507 with functional block 501 (e.g., incrementing completion counter 507, completing an early prediction latency period, and the like). In so doing, initiator PCI agent 500 implements the address dependent retry prediction process of the present invention (e.g., process 300).

It should be appreciated that initiator PCI agent 500 is but one implementation of the present invention. The present invention is well suited to other implementations optimized for different particular purposes. For example, as described above, initiator PCI agent 500 can be modified to include a plurality of retry delay registers and retry ID registers to track the latency of a corresponding plurality of target PCI agents. Such implementation would be especially useful where initiator PCI agent 500 is coupled to a heavily loaded PCI bus 503.

In addition, as described above, initiator PCI agent 500 can also be modified to include an additional number of retry delay registers. The additional retry delay registers allow the computation of an average latency period for a target PCI agent, for example, where one retry delay register stores the most recent latency period for the target PCI agent, a second retry delay register stores the latency period previous to the most recent, etc. Additionally, it should also be noted that initiator PCI agent 500 can be implemented as a portion of an integrated circuit device, as a separate PCI expansion bus card, etc. As such, the present invention is not limited to any particular form factor.

Thus, the present invention provides a method and system which minimizes or even eliminates the wasted retry accesses, where a faster initiator PCI agent continually attempts to access a slower target PCI agent. The system of the present invention reduces the effective access time for the retrying PCI agents, thus reducing the effects of repeated attempts and making the data transaction process with the slower target PCI agent more efficient. The system of the present invention significantly increases the available PCI bus data transfer bandwidth available to other PCI agents. In addition, the present invention provides for the issue of a retry access at an optimal time.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications as are suited to the particular use contemplated. It is intended that the scope of the invention be defined by the claims appended hereto and their equivalents.

What is claimed is:

1. A retry system for a PCI (peripheral component interconnect) agent in a PCI bus system, comprising:

an initiator agent adapted to couple to a PCI bus, said initiator agent further adapted to communicate via said PCI bus with a target agent by initiating a data transaction;

a retry identification register coupled to said initiator agent, said retry identification register adapted to store a target address and a transaction type corresponding to said target agent when said target agent issues a retry to said initiator agent; and a completion counter register coupled to said initiator agent, said completion counter register adapted to measure a latency period of said target agent, said latency period provided to said initiator agent such that said initiator agent efficiently completes a subsequent access corresponding to said target address and said transaction type by initiating said subsequent access at the expiration of said latency period.

2. The system of claim 1, further comprising:
   a retry delay register coupled to said initiator agent, said retry delay register adapted to store said latency period and provide said latency period to said initiator agent.

3. The system of claim 1, wherein said completion counter register is configured to measure said latency period by counting a number of PCI clock cycles occurring between said initiation of said data transaction by said initiator agent and a completion of said data transaction with said target agent.

4. The system of claim 2, further comprising:
   a logic circuit coupled to said initiator agent, said logic circuit adapted to interface said retry identification register, said completion counter register, and said retry delay register with said initiator agent.

5. The system of claim 4, wherein said initiator agent is configured to initiate said subsequent access when said completion counter corresponds to said latency period stored in said retry delay register.

6. The system of claim 4, wherein said completion counter is adapted to update said latency period when said subsequent access is completed.

7. The system of claim 4, wherein said logic circuit is adapted to determine an early prediction based upon a portion of said latency period, and wherein said initiator agent is adapted to initiate said subsequent access in accordance with said early prediction.

8. The system of claim 7, wherein said completion counter is further adapted to update said latency period in accordance with said early prediction when said subsequent access in accordance with said early prediction does not receive a retry from said target agent.

9. The system of claim 4, wherein said completion counter is adapted to update said latency period when said subsequent access receives a retry from said target agent.

10. An address dependent retry system for a PCI (peripheral component interconnect) agent in a PCI bus system, comprising:
    an initiator agent adapted to couple to a PCI bus, said initiator agent further adapted to communicate via said PCI bus with a target agent by initiating a data transaction;
    a retry identification register coupled to said initiator agent, said retry identification register adapted to store a target address and a transaction type corresponding to said target agent; and
    a completion counter register coupled to said initiator agent, said completion counter register adapted to measure a latency period of said target agent by counting a number of PCI clock cycles occurring between said initiating said data transaction and a completion of said data transaction; and
    a retry delay register coupled to said initiator agent, said retry delay register adapted to store said latency period, wherein said latency period is provided to said initiator agent such that said initiator agent reattempts a subsequent access corresponding to said target address and said transaction type at the expiration of said latency period to efficiently complete said subsequent access.

11. The system of claim 10, wherein said initiator agent is adapted to initiate said subsequent access when said completion counter corresponds to said latency period stored in said retry delay register.

12. The system of claim 10, wherein said completion counter updates said latency period when said subsequent access is completed.

13. The system of claim 10, further comprising:
    a logic circuit coupled to said initiator agent, said logic circuit adapted to interface said retry identification register, said completion counter register, and said retry delay register with said initiator agent.

14. The system of claim 13, wherein said logic circuit is adapted to determine an early prediction based upon a portion of said latency period, and wherein said initiator agent is further adapted to initiate said subsequent access in accordance with said early prediction.

15. The system of claim 14, wherein said completion counter is adapted to update said latency period in accordance with said early prediction when said subsequent access in accordance with said early prediction does not receive a retry from said target agent.

16. The system of claim 14, wherein said completion counter is adapted to update said latency period in accordance with said completion counter when said subsequent access in accordance with said latency period does receive a retry from said target agent.

17. The system of claim 10 further comprising:
    a second retry delay register coupled to said initiator agent, said second retry delay register adapted to store a second latency period and such that said initiator agent initiates said subsequent access in accordance with an average latency period.

18. The system of claim 10 further comprising:
    a second retry delay register and a second target identification register coupled to said initiator agent, said second retry delay register and said second target identification register adapted to store a second latency period for a second target agent.

19. In an initiator agent coupled to a PCI (peripheral component interconnect) bus system, an address dependent retry process for communicating with a target agent, the process comprising the steps of:
    a) commencing an initial access to a target agent;
    b) receiving a first retry from said target agent;
    c) upon receiving said first retry, determining a latency period of said target agent;
    d) commencing a subsequent access to said target agent;
    e) completing said subsequent access by reattempting said subsequent access after the expiration of said latency period.

20. The process from claim 19, wherein step b) further includes the step of storing a target address corresponding to target agent upon receiving said retry.

21. The process from claim 20, wherein step b) further includes the step of storing a transaction type corresponding to said initial access.

22. The process from claim 21, wherein step c) further includes the step of completing said initial access by reattempting said initial access until successful and measuring said latency period.

23. The process from claim 22, wherein step d) further includes the steps of:
    receiving a second retry from said target agent; and
    comparing said target address and said transaction type with said subsequent access.

24. The process from claim 23, wherein step e) includes the step of reattempting said subsequent access after the expiration of said latency period when said target address and said transaction type match said subsequent access.

25. The process from claim 19, wherein step c) further includes the step of measuring said latency period by incrementing a completion counter, wherein said completion counter is initialized upon commencing said initial access and incremented synchronous to a PCI clock until completing said initial access.

26. The process from claim 19, further including the step of completing said subsequent access by reattempting said subsequent access after the expiration of an early prediction, wherein said early prediction is based upon a portion of said latency period.

27. The process from claim 19, further including the step of adjusting said latency period as a time for completing a plurality of successive accesses to said target agent varies such that said latency period corresponds to an average latency for said target agent.

* * * * *